(12) United States Patent
Shinada

(10) Patent No.: US 6,169,606 B1
(45) Date of Patent: *Jan. 2, 2001

(54) FACSIMILE-COPY COMBINED APPARATUS

(75) Inventor: Tomohiro Shinada, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/007,075

(22) Filed: Jan. 14, 1998

(30) Foreign Application Priority Data

Jan. 17, 1997 (JP) .................................................. 9-006022

(51) Int. Cl.⁷ .................................................. H04N 1/32
(52) U.S. Cl. .......................................... 358/1.15; 358/468
(58) Field of Search ............................. 395/114; 358/400, 358/468, 401, 471, 474, 482, 483, 1.15; 382/312

(56) References Cited

U.S. PATENT DOCUMENTS

| 3,996,425 | * | 12/1976 | Low et al. ...................... | 179/18 DA |
| 4,159,530 | * | 6/1979 | Raimond ................. | 364/900 |
| 4,994,926 | * | 2/1991 | Gordon ................. | 358/407 |
| 5,357,350 | * | 10/1994 | Matsunai ................. | 358/168 |

FOREIGN PATENT DOCUMENTS

| 58-29264 | 2/1983 | (JP) . | |
| 61-176260 | 8/1986 | (JP) ................. | H04N 1/21 |
| 64-57869 | 6/1989 | (JP) . | |
| 1-317072 | 12/1989 | (JP) . | |
| 2-31555 | 2/1990 | (JP) ................. | H04N 1/00 |
| 32-36668 | 10/1991 | (JP) ................. | H04N 1/00 |
| 10-28197 | 1/1998 | (JP) . | |
| 10-200666 | 7/1998 | (JP) . | |

OTHER PUBLICATIONS

Patent Abstracts of Japan, vol. 1996, No. 07, Jul. 31, 1996 & JP 08 076645 A (Canon Inc.), Mar. 22, 1996, abstract only.

Patent Abstracts of Japan, vol. 1996, No. 07, Jul. 31, 1996 & JP 08 084243 A (Mita Ind Co Ltd.), Mar. 26, 1996, abstract only.

* cited by examiner

*Primary Examiner*—Jerome Grant, II
(74) *Attorney, Agent, or Firm*—Sughrue, Mion, Zinn, Macpeak & Seas, PLLC

(57) ABSTRACT

In a facsimile-copy combined apparatus, selection of one of either facsimile transmission or copying operation is implemented automatically corresponding to an input operation of a ten key although the user does not implement operation and so forth. Control section counts digits of numerical value and/or numerical value of a forefront-digit inputted from an operation section by a digit counter to store in memory section. On one hand, facsimile transmission of a manuscript data from a manuscript reading section is implemented through line interface section to telephone number based on digits of inputted numerical value and/or numerical value of the forefront-digit of the inputted numerical value. On the other hand, print-output according to number of copies based on the digits and/or numerical value of the forefront-digit is implemented through the printer section. Here, when zero is numerical value of the forefront-digit of the inputted numerical value, or when zero is not numerical value of the forefront-digit of the inputted numerical value and the inputted numerical value exceeds the maximum number of copies (prescribed numerical value) to be capable of copying, the inputted numerical value is judged as telephone number of facsimile transmission destination. While when zero is not numerical value of the forefront-digit of the inputted numerical value and the inputted numerical value does not exceed the prescribed numerical value, state is judged as copying operation and the inputted numerical value is judged as number of copies.

22 Claims, 3 Drawing Sheets

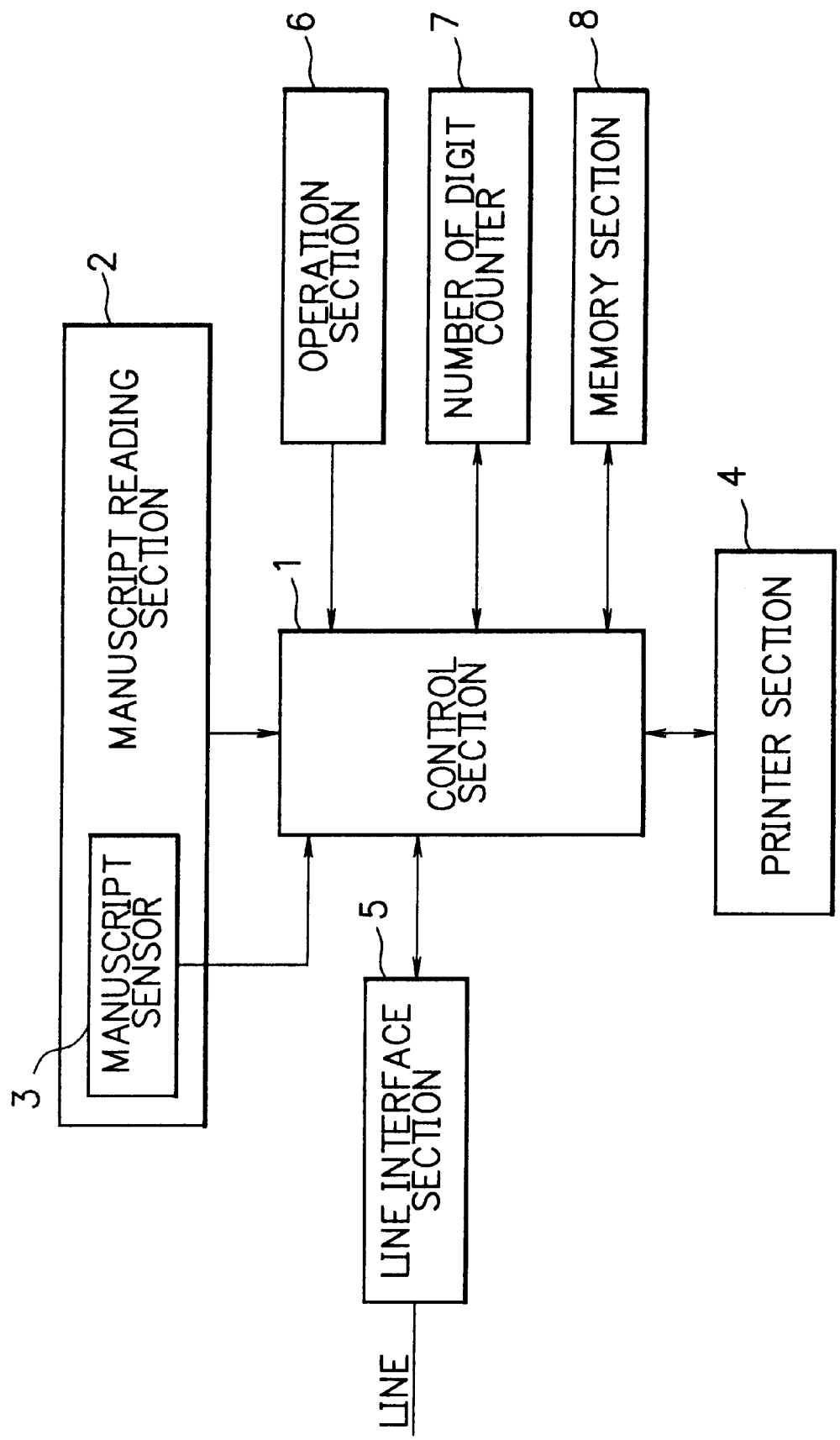
F I G. 1

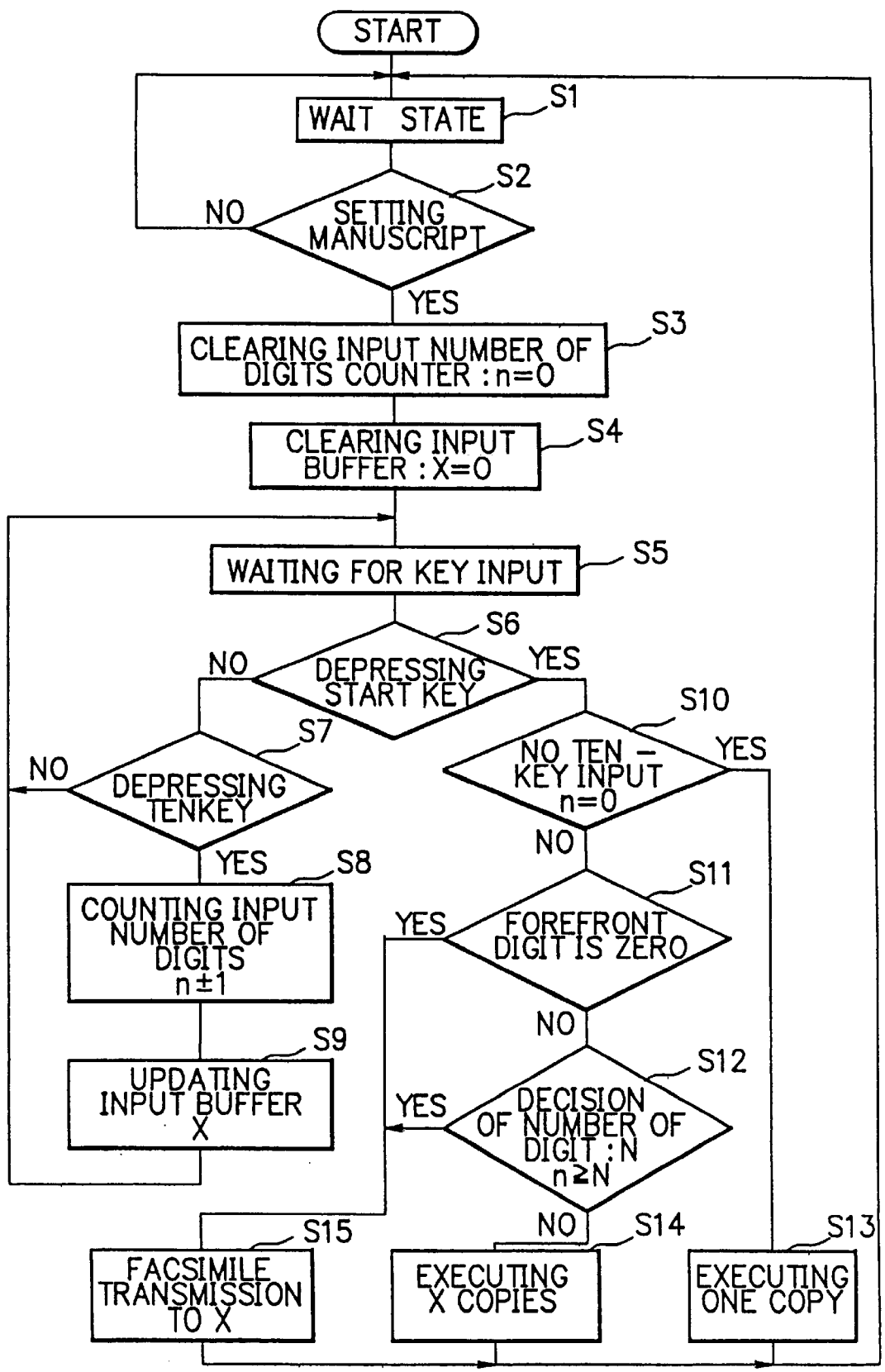

ically one
FACSIMILE-COPY COMBINED APPARATUS

BACKGROUND OF THE INVENTION

The present invention relates to a facsimile-copy combined apparatus. More to particularly, this invention relates to a facsimile-copy combined apparatus which executes one of either facsimile transmission-reception of a manuscript or copying of a manuscript, while selecting automatically one of the facsimile transmission and the copy based on the number of digits of numerical value and/or numerical value of the forefront-digit which numerical value is inputted from a ten key.

Description of the Prior Art

Formerly, in this kind of facsimile-copy combined apparatus, a button (switch) or a touch panel is provided with an operation section for executing selection of function in connection with facsimile transmission or copying operation. The user maneuvers the selection button or touch panel. When the user desires the facsimile transmission, the user implements the selection of the facsimile transmission while maneuvering the button or touch panel of the operation section, before maneuvering to be inputted telephone number of the facsimile transmission destination. While when the user desires copy, the user selects copy-execution, while maneuvering the button or touch panel of the operation section, before maneuvering to be inputted numerical value of the number of copies.

This kind of the facsimile-copy combined apparatus is disclosed in the Japanese Patent Application Laid-Open No. SHO 61-176260, Japanese Patent Application Laid-Open No. HEI 2-31555, or Japanese Patent Application Laid-Open NO. HEI 3-236668. In the conventional example of Japanese Patent Application Laid-Open No. SHO 61-176260, there is provided a circuit controller, and an interface circuit to which an attached telephone is connected in the apparatus. When the attached telephone is of off-hook state, the apparatus functions as a facsimile transmitter, while when the attached telephone is of on-hook state, the apparatus executes the copy or stores copy image data in memory.

In the conventional example of Japanese Patent Application Laid-Open No. HEI 2-31555, the apparatus judges a state of a selected function of facsimile or copy such that when hand-set (receiver) placed on the apparatus is raised, off-signal of a hook-switch is generated to be judged as facsimile state, while when the hand-set is put on the apparatus, on-signal of a hook-switch is generated to be judged as copy state. Namely, when the hand-set is raised, the hook-switch comes into off-state. The apparatus functions as a facsimile transmitter. While when the hand-set is put on the apparatus, the hook-switch comes into on-state. The apparatus is capable of implementing the copy.

In the conventional example of Japanese Patent Application Laid-Open No. HEI 3-236668, it causes an identification code to record beforehand, which identification code is for example a mark sheet and so forth on a cover of a read manuscript and a part of the inside of the apparatus, thus it causes processing content corresponding to the manuscript to be an automatic setting while analyzing the identification code when the manuscript is read.

However, there are following defects in the above-described conventional examples:

(1) In the apparatus which implements a function selection of the facsimile transmission or the copy by means of button or touch panel of the operation section, it is necessary to confirm a function (facsimile transmission or copy) which is selected, before executing the facsimile transmission or the copy. When the setting is not desired by the user, it is necessary to implement a function setting desired by the user, while depressing button or touch panel of the operation section. A confirmation and a manipulation thereof are troublesome. In this case, there is a wrong that when the facsimile transmission is implemented under wait state of copy setting, copy operation is started with the numerical value inputted as telephone number of the transmission destination as the number of copies.

(2) In the conventional example of the Japanese Patent Application Laid-Open No. SHO 61-176260, it is incapable of applying to the apparatus with no attached telephone, because it causes facsimile transmission or copy to execute based on the state of Off or On-hook of the attached telephone.

(3) In the conventional example of the Japanese Patent Application Laid-Open No. HEI 2-31555, the apparatus judges a state of selected function of facsimile or copy such that when hand-set (receiver) placed on the apparatus is raised, off-signal of a hook-switch is generated to be judged as facsimile state, while when the hand-set is put on the apparatus on-signal of a hook-switch is generated to be judged as copy state. Namely, it is always necessary to raise the hand-set or to place the hand-set thereon. The manipulation thereof is troublesome for the user.

(4) In the conventional example of the Japanese Patent Application Laid-Open No. HEI 3-236668, there is the defect that a time-consuming is required to print (description) the identification code, because it causes the identification code to analyze at the time when the manuscript is read so that the processing content corresponding to the manuscript is set automatically.

SUMMARY OF THE INVENTION

In view of the foregoing, it is an object of the present invention, for achieving the above-mentioned problems to provide a facsimile-copy combined apparatus, wherein a user does not implement a specific instructing manipulation or a preparation for the facsimile transmission or the copy, but it becomes capable of selecting automatically one of either facsimile transmission or copy corresponding to inputting operation of the ten key, and it becomes capable of executing the facsimile transmission or the copy easily and certainly.

In accordance with one aspect of the present invention, for achieving the above-mentioned object, there is provided a facsimile-copy combined apparatus which executes a facsimile transmission and a copying operation respectively, comprising, an operation means for inputting one of either a telephone number of a facsimile transmission destination or the number of copies, wherein one of either the facsimile transmission or the copying operation is selected automatically to be executed based on digits of numerical value and/or numerical value of a forefront-digit thereof inputted from the operation means.

In accordance with another aspect of the present invention, there is provided a facsimile-copy combined apparatus which comprises a manuscript reading means for reading one of either a manuscript of facsimile transmission or a manuscript of copying operation, and for transmitting the manuscript data which is read, a line interface means for implementing control of a facsimile transmission-reception, a printing means for printing to be outputted one of either facsimile reception data from the line interface means or the manuscript data from the manuscript reading means in copying operation, an operation means for instructing start of either the facsimile transmission or the copying operation, after inputting telephone number of the facsimile transmission destination and number of copies thereto respectively, a digit-number counter for counting the numerical value of either the telephone number of the facsimile transmission destination or the number of copies inputted from the operation means, a memory means for storing the numerical value of either telephone number of the facsimile transmission destination or the number of copies inputted from the operation means, and a control means for implementing control which selects automatically to be executed one of either facsimile transmission for transmitting manuscript data read by the manuscript reading means from the line interface means or the copying operation which prints to be outputted through the printing means, for copying manuscript data read by the manuscript reading means from the line interface means, while counting by the digit-number counter and storing by the memory means, digits of the numerical value and/or a numerical value of the forefront-digit thereof inputted from the operation means.

Preferably, there is provided a facsimile-copy combined apparatus, wherein the control means judges an inputted numerical value as telephone number of a facsimile transmission destination in cases where zero is the numerical value of the forefront-digit inputted from the operation means.

Preferably, there is provided a facsimile-copy combined apparatus, wherein when an operation start is instructed by the operation means, before numerical value is inputted, and zero is the numerical value of the forefront-digit of the inputted numerical value, the control means implements facsimile transmission of the read manuscript data, while judging the inputted numerical value as the telephone number of facsimile transmission destination.

Preferably, there is provided a facsimile-copy combined apparatus wherein when zero is not numerical value of the forefront-digit in the inputted numerical value inputted from the operation means and the inputted numerical value exceeds prescribed numerical value, the control means judges the inputted numerical value as telephone number of the facsimile transmission destination.

Preferably, there is provided a facsimile-copy combined apparatus wherein when an operation start is instructed by the operation means, before numerical value is inputted, in which zero is not numerical value of the forefront-digit of the inputted numerical value, and the inputted numerical value exceeds the maximum number of copies to be capable of copying, the control means judges the inputted numerical value as telephone number of facsimile transmission destination, thus causing the read manuscript data to implement for facsimile transmission.

Preferably, there is provided a facsimile-copy combined apparatus wherein when zero is not numerical value of the forefront-digit of the inputted numerical value from the operation means and the inputted numerical value does not exceed prescribed numerical value, the control means judges the inputted numerical value as the number of copies for copying.

Preferably, there is provided a facsimile-copy combined apparatus wherein when operation start is instructed by the operation means before numerical value is inputted, in which zero is not numerical value of the forefront-digit of the inputted numerical value, and the inputted numerical value does not exceeds the maximum number of copies to be capable of copying, the control means judges the inputted numerical value as the number of copies to be capable of copying, thus causing the read manuscript data to copy with the number of copies.

In accordance with the still another aspect of the present invention, there is provided a method for automatic selection of one of either facsimile transmission or copying operation of a facsimile-copy combined apparatus which comprises the steps of a manuscript reading step for reading one of either a manuscript of facsimile transmission or a manuscript of copying operation, and for transmitting manuscript data which is read, a line interfacing step for implementing a control of a facsimile transmission-reception, a printing step for printing to be outputted one of either facsimile reception data from the line interfacing step or the manuscript data from the manuscript reading step in copying operation, an operating step for instructing start of either the facsimile transmission or the copying operation, after inputting telephone number and number of copies thereto respectively, a digits counting step for counting numerical value of either telephone number of facsimile transmission destination or the number of copies inputted from the operating step, a storing step for storing numerical value of either telephone number of the facsimile transmission destination or the number of copies inputted from the operating step, and a controlling step for implementing control which selects automatically to be executed one of either the facsimile transmission for transmitting manuscript data read by the manuscript reading step from the line interfacing step or the copying operation which prints to be outputted through the printing step, for copying manuscript data read by the manuscript reading step from the line interfacing step, while counting by the digits counting step and storing by the storing step, digits of numerical value and/or numerical value of the forefront-digit inputted from the operating step.

As stated above, this kind of facsimile-copy combined apparatus selects one of either facsimile transmission or copying operation to be executed based on the digits of inputted numerical value and/or numerical value of the forefront-digit of the inputted numerical value inputted from operation means.

In this case, when zero is the numerical value of the forefront-digit of the inputted numerical value, or when zero is not the numerical value of the forefront-digit of the inputted numerical value and the inputted numerical value exceeds the maximum number of copies (prescribed numerical value) to be capable of copying, the inputted numerical value is judged as the telephone number of facsimile transmission destination. While when zero is not the numerical value of the forefront-digit of the inputted numerical value and the inputted numerical value does not exceed the prescribed numerical value, state is judged as copying operation and the inputted numerical value is judged as the number of copies. The number of copies are executed.

In the facsimile-copy combined apparatus, it causes one of either the facsimile transmission or the copying operation to be selected automatically to execute based on the digits of the numerical value inputted from the operation means and/or numerical value of the forefront-digit, thereby, it is not necessary for the user to implement specific instructing operation or preparation to select one of either the facsimile transmission or the copying operation. Namely, it comes to be capable of selecting automatically one of either the facsimile transmission or the copying operation corresponding to the input operation of the ten-key. One of either the facsimile transmission or the copying operation can be selected easily and certainly.

Consequently, it is unnecessary for the user to implement specific instructing operation or preparation for selecting one of either facsimile transmission or copying operation. It is unnecessary to implement function selection of one of either facsimile transmission or copying operation according to button or touch panel explained in prior art, it is unnecessary to implement judgment in accordance with on-off signal of hook switch when attached telephone is raised or placed thereon.

Further, it is unnecessary to prepare automatic setting of the processing content while reading identification code provided at the manuscript. Namely one of either facsimile transmission or copying operation is automatically selected corresponding to input operation of ten-key, with the result that facsimile transmission or copying operation is implemented easily and certainly.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWING

FIG. 1 is a block diagram showing a constitution according to an embodiment of a facsimile-copy combined apparatus of the present invention;

FIG. 3 is a flow chart showing processing procedure of operation of the embodiment.

DETAILED DESCRIPTION OF THE PREFERRED EMBODIMENTS

Figure 2:
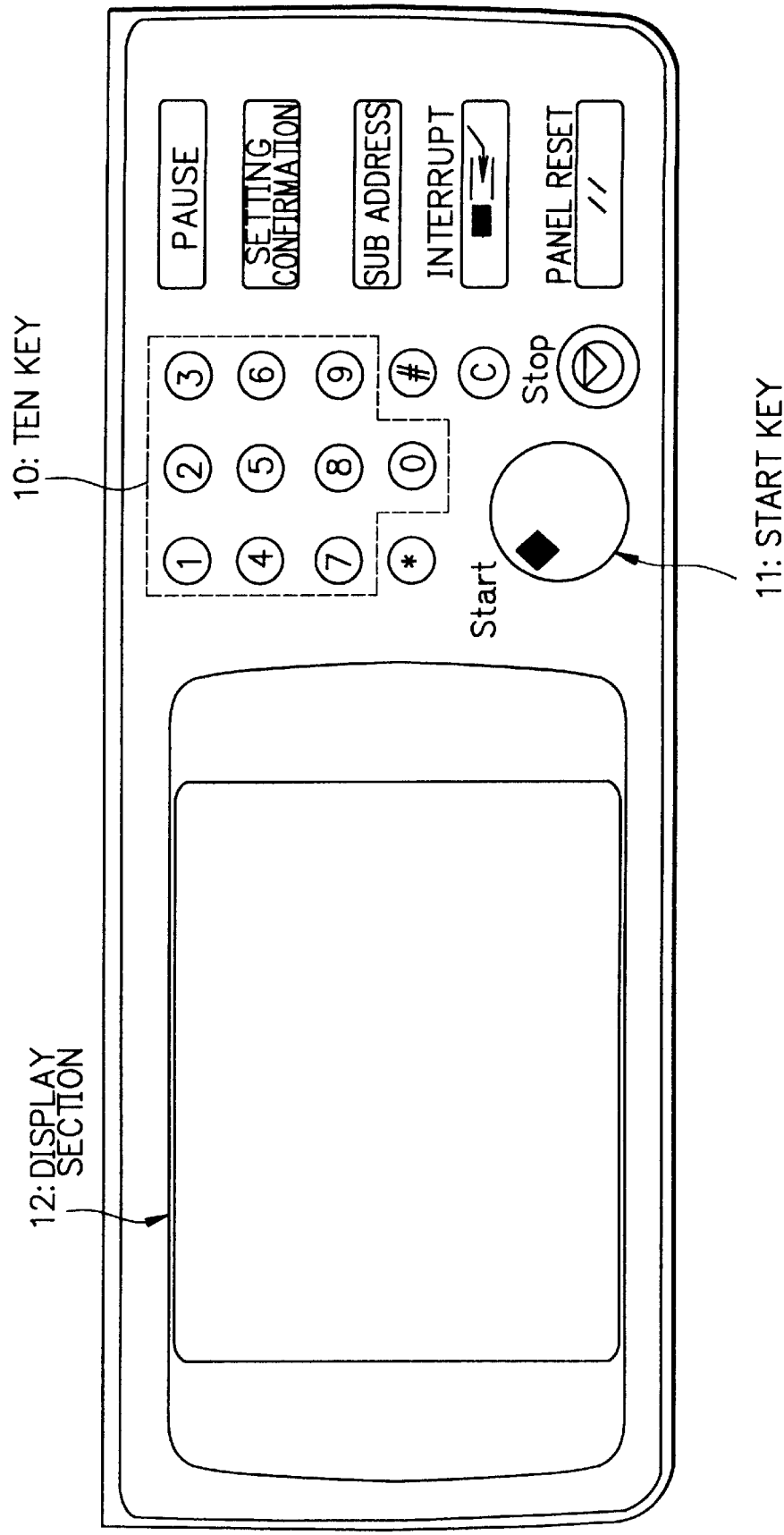
FIG. 2 is a front view showing an external constitution of an operation section of FIG. 1.

A preferred embodiment of a facsimile-copy combined apparatus of the present invention will now be described in detail referring to the accompanying drawings.

FIG. 1 is a block diagram showing a constitution according to an embodiment of a facsimile-copy combined apparatus of the present invention.

In FIG. 1, the facsimile-copy combined apparatus comprises a control section 1 which controls each section of the apparatus, in particular, which implements control of an automatic selection which selects one of either facsimile transmission or copy corresponding to input manipulation of a ten-key, a manuscript reading section 2 for reading the manuscript in the facsimile transmission or the copy, before transmitting the manuscript data to the control section 1.

The facsimile-copy combined apparatus further comprises a manuscript sensor 3 provided with the manuscript reading section 2 for detecting setting of the manuscript in the facsimile transmission or the copy, thus transmitting a detection signal to the control section 1, a circuit interface section 5 for implementing control of facsimile transmission-reception due to control of the control section 1 for example implementing the facsimile transmission-reception by G3-system, and a printer section 4 which is a printing means for performing print out of a telegram data by control of the control section 1 in the facsimile reception, and for performing print out of read manuscript data in the copy.

Furthermore, as shown in FIG. 2, the facsimile-copy combined apparatus has a ten-key for inputting telephone number, various kind of function selection keys, a start key for instructing of start of the facsimile transmission or the copying operation, and an operation section 6 for displaying various kind of processing informations. Moreover, the facsimile-copy combined apparatus has a digit-number counter 7 for counting-up ten-key information (telephone number of facsimile transmission destination or numerical value of number of copies) which is inputted, and a memory section 8 for storing ten-key information (numerical value) which is inputted.

FIG. 2 is a front view showing an external constitution of an operation section of FIG. 1.

In FIG. 2, the operation section 6 comprises a ten-key 10 for inputting the telephone number of the facsimile transmission destination and the number of copies, and a start key 11 for instructing the start of the facsimile transmission or the copying operation. Further, the operation section 6 has a display section 12 such as a liquid crystal display (LCD) for displaying on a screen the telephone number inputted thereto, function name which selected, and processing content and another keys for function selection.

Next, operation of this apparatus according to the embodiment will be described.

FIG. 3 is a flow chart showing processing procedure of operation of the embodiment.

In FIGS. 1, 2 and 3, before explanation of processing procedure of the operation, there is explained a judgment-coefficient N which is used for judging whether the facsimile transmission is automatically selected or the copying operation is automatically selected. There can be considered following three operations (1), (2), and (3), when it causes the facsimile-copy combined apparatus to be operated shown in FIG. 1.

(1) When facsimile transmission is implemented, it causes the manuscript to set to the manuscript reading section 2, before inputting the telephone number of facsimile transmission destination from the ten-key of the operation section 6, then depressing the start key 11.

(2) When it causes the manuscript to copy with one copy, the manuscript is set to the manuscript reading section 2, next, causing the start key 11 to depress in the operation section 6.

(3) When it causes the manuscript to copy a plurality of copies, the manuscript is set to the manuscript reading section 2, next, inputting the number of copies from the ten-key 10, further depressing the start key 11.

As described above, in any cases, operating procedure is that it causes the manuscript to set, before inputting the numerical value from the ten-key, next, depressing the start key.

Consequently, in order to implement decision whether the facsimile transmission is automatically selected or the copying operation is automatically selected, it is proper to judge zero of the forefront-digit or a plurality of digits of the inputted numerical value due to depression of the ten-key 10.

As a first judgment condition, it causes a judgment coefficient N to be set due to the number of depression of the ten-key 10, thus if inputted-digit from the ten-key 10 is less than N, selecting the copying operation, then causing the copying operation to execute. While if inputted-digit from the ten-key 10 is more than N, it causes the facsimile transmission to execute.

To put it concretely, when available number of copies of the facsimile-copy combined apparatus shown in FIG. 1 is of maximum number being 999 copies, N is set to N=4. In general, the telephone number is more than 5-digit in telephone network within the city limits, it is practical to cause the decision value to be 4-digit. Further when it causes a private branch exchange and so forth to be used as extension network, extension telephone number is to be 2-digit or 3-digit. In this case, it is proper that N is set to N=2 or N=3.

There is a method for discriminating classification of the forefront-digit as a second decision condition. When the user desires the copying operation, not zero is inputted as the forefront-digit from the ten-key 10. Consequently, when the forefront-digit is zero, it causes the operation to be judged as the facsimile transmission regardless of the digits of the inputted numerical value.

Hereinafter, it causes processing procedure to be described in detail using the above-described two, the first and the second judgment conditions.

There exists a wait state (STEP S1), in this state, the manuscript is not set on the manuscript reading section 2, each of the facsimile transmission or the copying operation is capable of implementing.

When the user sets a manuscript for the facsimile transmission or a manuscript for copying operation to the manuscript reading section 2, the manuscript sensor 3 comes to be on-state, thus due to the on-signal, the control section 1 recognizes the set of the manuscript (STEP S2:Yes). Next, a digit-number counter 7 is cleared by control of the control section 1. A count value of the digit-number counter is cleared to n=0 (STEP S3).

Further, the control section 1 clears numerical value of an input buffer within the memory section 8 stored therein a ten-key information which inputted thereafter (STEP S4). Here, value of the input buffer comes to be x=0. Thereafter, the control section is taking in the ten-key information from the operation section 6 (STEP S5).

When it causes the manuscript to copy with one copy, the user depresses the start key 11 without inputting from the ten-key 10 (STEP S6: Yes). In this case, a count value of the digit-number counter 7 is of n=0, and it is judged that the control section 1 causes the manuscript to copy with one copy (STEP S10: Yes). The control section 1 controls the printer section 4, thus the printer section 4 copies the manuscript one copy to implement the print out (STEP S13). The facsimile-copy combined apparatus returns to wait state after termination of the print out (STEP S16).

In the wait state of Key-input of STEP S5, when the user selects each one of the facsimile transmission or the case where it causes the manuscript to copy a plurality of copies, the user depresses the ten-key 10 to be inputted the telephone number of destination or the number of copies before depressing the start key 11 (STEP S7: Yes). The digit-number counter 7 counts up in accordance with the inputted digits due to the control of the control section 1 (STEP S8).

Further, similarly, the control section 1 renews value x of the input buffer within the memory section 8 in accordance with the inputted numerical value (STEP S9). When the user terminates input from the ten-key 10 to be depressed the start key 11, the control section 1 judges the forefront-digit of the inputted numerical value (STEP S10: No, STEP S11). Here, the value x of the input buffer within the memory section 8 is one-digit or tree-digit of maximum 999 in case of copying operation, while further, in case of telephone number, the value x of the input buffer comes to be numerical sequence with the digits corresponding to the telephone number.

Here, the control section 1 judges the numerical value of the forefront-digit of the numerical sequence of the input buffer, thus when the numerical value is zero under this judgment (STEP S11: Yes), causing the input from the ten-key 10 to be telephone number, thus the control section 1 controls the line interface section 5 to implement facsimile transmission of data read from the manuscript in the manuscript reading section 2 from this line to the telephone number (numerical sequence x)(STEP S15). This corresponds to the fact that the forefront-digit of an area code is concretely zero, or zero is used for an originating number of an outside line from an extension telephone network. The facsimile-copy combined apparatus returns to the wait state (STEP S1) after termination of the facsimile transmission on the control of facsimile communication according to the control section 1 and the line interface section 5.

When numerical value of the forefront-digit is not zero (No) under the judgment of the STEP S11, next, the control section 1 judges digits of the inputted numerical value (STEP S12). Here, when digits of inputted numerical value n are more than the digits of the judgment-number N, the control section 1 controls the line interface section 5 in the same way that the forefront-digit of the inputted numerical value is zero, thus implementing facsimile transmission of the manuscript data read from the manuscript at the manuscript reading section 2 toward the telephone number (numerical sequence x) inputted from the ten-key 10 through the line (STEP S15). The facsimile-copy combined apparatus returns to the wait state (STEP S1) after termination of the facsimile transmission under the control of the facsimile communication according to the control section 1 and the line interface section 5. When digits of the inputted numerical value n are less than the digits of the judgment-number N under the judgment of STEP S12 (No), the control section 1 controls the printer section 4 to cause the manuscript to copy with x copies, thus implementing print out through the printer section 4 (STEP S14). The facsimile-copy combined apparatus returns to the wait state (STEP S1) after termination of the copying operation.

As described above, in the facsimile-copy combined apparatus according to the present invention, it causes one of either the facsimile transmission or the copying operation to be selected automatically to execute based on the digits of numerical value inputted from the operation means and/or numerical value of the forefront-digit, thereby, it is not necessary for the user to implement specific operation or preparation to select one of either the facsimile transmission or the copying operation. Namely, it comes to be capable of selecting automatically one of either the facsimile transmission or the copying operation corresponding to input operation of the ten-key. One of either the facsimile transmission or the copying operation can be selected easily and certainly.

While preferred embodiments of the invention have been described using specific term, such description is for illustrative purpose only, and it is to be understood that changes and variations may be made without departing from the spirit or scope of the following claims.

What is claimed is:

1. A facsimile-copy combined apparatus for executing a facsimile transmission and a copying operation respectively, said facsimile-copy combined apparatus comprising:

an operation means for inputting either a telephone number of a facsimile transmission destination or a number of copies; and a control means for automatically selecting for executing said facsimile transmission, when a first digit inputted from said operation means is a predetermined digit, and automatically selecting for execution either said facsimile transmission or said copying operation based on a number of digits input by said operation means, when said first digit is not said predetermined digit.

2. A facsimile-copy combined apparatus comprising:

a manuscript reading means for reading either data of a manuscript of a facsimile transmission or data of a manuscript of a copying operation, and for transmitting manuscript data which is read;

a line interface means for implementing control of at least one of a facsimile transmission operation and a facsimile reception operation and for receiving facsimile data;

a printing means for printing either the facsimile data received by said line interface means or said data of the manuscript of the copying operation;

an operation means for instructing start of either said facsimile transmission operation or said copying operation, after inputting a numerical value of either a telephone number of a facsimile transmission destination or a number of copies thereto;

a digit-number counter for counting a number of digits of the numerical value inputted from said operation means;

a memory means for storing the numerical value of either said telephone number of said facsimile transmission destination or said number of copies inputted from said operation means; and a control means for automatically selecting for execution said facsimile transmission operation for transmitting from said line interface means said manuscript data of a facsimile transmission read by said manuscript reading means, when a first digit of the numerical value input by said operation means is a predetermined digit, and automatically selecting for execution, based on said number of digits counted by said digit-number counter, either said facsimile transmission operation or said copying operation for copying said data of a manuscript of a copying operation by printing through said printing means, when said first digit is not said predetermined digit.

3. A facsimile-copy combined apparatus as claimed in claim 2, wherein said control means judges the numerical value input from said operation means as said telephone number of the facsimile transmission destination in cases where zero is the first digit inputted from said operation means.

4. A facsimile-copy combined apparatus as claimed in claim 2, wherein when said first digit of the numerical value input by said operation means is not zero, said control means executes said facsimile transmission operation when said number of digits counted by said digit number counter exceeds a prescribed numerical value, using said inputted numerical value as the telephone number of the facsimile transmission destination.

5. A facsimile-copy combined apparatus as claimed in claim 2, wherein when said first digit of the numerical value input by said operation means is not zero, said control means executes said copying operation using said inputted numerical value as the number of copies for copying.

6. A facsimile-copy combined apparatus, comprising:

a manuscript reading means for reading data of either a manuscript of a facsimile transmission or a manuscript of a copying operation, and for transmitting manuscript data which is read;

a line interface means for implementing control of at least one of a facsimile transmission and a facsimile reception and for receiving facsimile data;

a printing means for printing either the facsimile data received from said line interface means or said data of the manuscript of the copying operation;

an operation means for instructing start of either said facsimile transmission or said copying operation, after inputting a telephone number and a number of copies thereto;

a digit-number counter for counting a number of digits of either said telephone number of facsimile transmission destination or the number of copies inputted from said operation means;

a memory means for storing a numerical value of either said telephone number of said facsimile transmission destination or said number of copies inputted from said operation means; and a control means for implementing control of automatically selecting for execution either said facsimile transmission for transmitting from said line interface means said manuscript data read by said manuscript reading means or said copying operation which prints a number of copies through said printing means, for controlling copying said manuscript data read by said manuscript reading means from said line interface means, and for controlling counting by said digit-number counter the number of digits and storing by said memory means the numerical value of either said telephone number of said facsimile transmission destination or said number of copies inputted from said operation means and/or a numerical value of a forefront-digit inputted from said operation means, wherein said control means judges the numerical value input from said operation means as said telephone number of the facsimile transmission destination in cases where zero is the numerical value of said forefront-digit inputted from said operation means, and wherein when an operation start is instructed by said operation means, before the numerical value is inputted from said operation means, and zero is the numerical value of said forefront-digit of the inputted numerical value, said control means implements facsimile transmission of the read manuscript data, while judging said numerical value input from said operation means as the telephone number of said facsimile transmission destination.

7. A facsimile-copy combined apparatus, comprising:

a manuscript reading means for reading data of either a manuscript of a facsimile transmission or a manuscript of a copying operation, and for transmitting manuscript data which is read;

a line interface means for implementing control of at least one of a facsimile transmission and a facsimile reception and for receiving facsimile data;

a printing means for printing either the facsimile data received from said line interface means or said data of the manuscript of the copying operation;

an operation means for instructing start of either said facsimile transmission or said copying operation, after inputting a telephone number and a number of copies thereto;

a digit-number counter for counting a number of digits of either said telephone number of facsimile transmission destination or the number of copies inputted from said operation means;

a memory means for storing a numerical value of either said telephone number of said facsimile transmission destination or said number of copies inputted from said operation means; and a control means for implementing control of automatically selecting for execution either said facsimile transmission for transmitting from said line interface means said manuscript data read by said manuscript reading means or said copying operation which prints a number of copies through said printing means, for controlling copying said manuscript data read by said manuscript reading means from said line interface means, and for controlling counting by said digit-number counter the number of digits and storing by said memory means the numerical value of either said telephone number of said facsimile transmission destination or said number of copies inputted from said operation means and/or a numerical value of a forefront-digit inputted from said operation means, wherein when zero is not the numerical value of said forefront-digit of the numerical value inputted from said operation means and said inputted numerical value exceeds a prescribed numerical value, said control means judges said inputted numerical value as the telephone number of said facsimile transmission destination, and wherein when said operation start is instructed by said operation means, before the numerical value is input from said operation means, in which zero is not the numerical value of said forefront-digit of the inputted numerical value, and said inputted numerical value exceeds the maximum number of copies which can be copied, said control means judges said inputted numerical value as the telephone number of said facsimile transmission destination, and implements facsimile transmission of the data read by said manuscript reading means.

8. A facsimile-copy combined apparatus, comprising:

a manuscript reading means for reading data of either a manuscript of a facsimile transmission or a manuscript of a copying operation, and for transmitting manuscript data which is read;

a line interface means for implementing control of at least one of a facsimile transmission and a facsimile reception and for receiving facsimile data;

a printing means for printing either the facsimile data received from said line interface means or said data of the manuscript of the copying operation;

an operation means for instructing start of either said facsimile transmission or said copying operation, after inputting a telephone number and a number of copies thereto;

a digit-number counter for counting a number of digits of either said telephone number of facsimile transmission destination or the number of copies inputted from said operation means;

a memory means for storing a numerical value of either said telephone number of said facsimile transmission destination or said number of copies inputted from said operation means; and a control means for implementing control of automatically selecting for execution either said facsimile transmission for transmitting from said line interface means said manuscript data read by said manuscript reading means or said copying operation which prints a number of copies through said printing means, for controlling copying said manuscript data read by said manuscript reading means from said line interface means, and for controlling counting by said digit-number counter the number of digits and storing by said memory means the numerical value of either said telephone number of said facsimile transmission destination or said number of copies inputted from said operation means and/or a numerical value of a forefront-digit inputted from said operation means, wherein when zero is not the numerical value of said forefront-digit of the numerical value inputted from said operation means and said inputted numerical value does not exceed a prescribed numerical value, said control means judges said inputted numerical value as the number of copies for copying, and wherein when said operation start is instructed by said operation means before the numerical value is input by said operation means in which zero is not the numerical value of said forefront-digit of said inputted numerical value, and said inputted numerical value does not exceed the maximum number of copies which can be copied, said control means judges said inputted numerical value as the number of copies of said data read by said manuscript reading means which are to be made.

9. A method for automatic selection of either a facsimile transmission or a copying operation of a facsimile-copy combined apparatus comprising the steps of:

inputting either a telephone number of a facsimile transmission destination or a number of copies; and selecting for execution said facsimile transmission, when a first digit input in said inputting step is a predetermined digit, and selecting for execution either said facsimile transmission or said copying operation based on a number of digits input in said inputting step when said first digit is not said predetermined digit.

10. A method for automatic selection of either a facsimile transmission operation or a copying operation of a facsimile-copy combined apparatus comprising the steps of:

a manuscript reading step for reading either data of a manuscript of a facsimile transmission or data of a manuscript of the copying operation, and for transmitting manuscript data which is read;

a line interfacing step for implementing control of at least one of a facsimile transmission operation and a facsimile reception operation and for receiving facsimile data;

a printing step for printing either the facsimile data received from said line interfacing step or said data of the manuscript of the copying operation;

an operating step for instructing start of either said facsimile transmission operation or said copying operation, after inputting a numerical value of either a telephone number of a facsimile transmission destination or a number of copies;

a digits counting step for counting a number of digits of the numerical value inputted from said operating step;

a storing step for storing the numerical value of either said telephone number of said facsimile transmission destination or said number of copies inputted from said operating step; and a controlling step for automatically selecting for executing said facsimile transmission operation for transmitting in said line interfacing step said data of a manuscript of a facsimile transmission read by said manuscript reading step, when a first digit of the numerical value is a predetermined digit, and automatically selecting for execution, based on said number of digits of said numerical value, either said facsimile transmission operation or said copying operation for copying said data of a manuscript of the copying operation, when said first digit is not said predetermined digit.

11. A method for automatic selection of one of either facsimile transmission or copying operation of a facsimile-copy combined apparatus as claimed in claim 10, wherein said controlling step judges the numerical value input from said operating step as said telephone number of the facsimile transmission destination in cases where zero is the first digit inputted from said operating step.

12. A method for automatic selection of one of either facsimile transmission or copying operation of a facsimile-copy combined apparatus as claimed in claim 10, wherein when said first digit of the numerical value input by said operating step is not zero, said controlling step executes said facsimile transmission operation when said number of digits counted by said digit number counter exceeds a prescribed numerical value, using, said inputted numerical value as the telephone number of the facsimile transmission destination.

13. A method for automatic selection of one of either facsimile transmission or copying operation of a facsimile-copy combined apparatus as claimed in claim 10, wherein when said first digit of the numerical value input by said operating step is not zero, said controlling step executes the copying operation when said inputted numerical value does not exceed a prescribed numerical value, using said inputted numerical value as the number of copies for copying.

14. A method for automatic selection of either a facsimile transmission or a copying operation of a facsimile-copy combined apparatus, comprising the steps of:

a manuscript reading step for reading data of either a manuscript of a facsimile transmission or a manuscript of a copying operation, and for transmitting manuscript data which is read;

a line interfacing step for implementing control of at least one of a facsimile transmission and a facsimile reception and for receiving facsimile data;

a printing step for printing either the facsimile data received from said line interfacing step or said data of the manuscript of the copying operation;

an operating step for instructing start of either said facsimile transmission or said copying operation, after inputting telephone number and number of copies thereto respectively;

a digits counting step for counting a number of digits of either said telephone number of facsimile transmission destination or the number of copies inputted from said operating step;

a storing step for storing a numerical value of either said telephone number of said facsimile transmission destination or said number of copies inputted from said operating step; and a controlling step for implementing control of automatically selecting for execution either said facsimile transmission for transmitting from said line interfacing step said manuscript data read by said manuscript reading step or said copying operation which prints a number of copies through said printing step, for controlling copying said manuscript data read by said manuscript reading step from said line interfacing step, and for controlling counting by said digits counting step and storing by said storing step, the numerical value of either said telephone number of said facsimile transmission destination or said number of copies inputted from said operation means and/or a numerical value of a forefront-digit inputted from said operating step, wherein said controlling step judges the numerical value input from said operation step as said telephone number of the facsimile transmission destination in cases where zero is the numerical value of said forefront-digit inputted from said operating step, and wherein when an operation start is instructed by said operating step, before the numerical value is inputted from said operating step, and zero is the numerical value of said forefront-digit of the inputted numerical value, said controlling step implements facsimile transmission of the read manuscript data, while judging said inputted numerical value as the telephone number of said facsimile transmission destination.

15. A method for automatic selection of either a facsimile transmission or a copying operation of a facsimile-copy combined apparatus, comprising the steps of:

a manuscript reading step for reading data of either a manuscript of a facsimile transmission or a manuscript of a copying operation, and for transmitting manuscript data which is read;

a line interfacing step for implementing control of at least one of a facsimile transmission and a facsimile reception and for receiving facsimile data;

a printing step for printing either the facsimile data received from said line interfacing step or said data of the manuscript of the copying operation;

an operating step for instructing start of either said facsimile transmission or said copying operation, after inputting telephone number and number of copies thereto respectively;

a digits counting step for counting a number of digits of either said telephone number of facsimile transmission destination or the number of copies inputted from said operating step;

a storing step for storing a numerical value of either said telephone number of said facsimile transmission destination or said number of copies inputted from said operating step; and a controlling step for implementing control of automatically selecting for execution either said facsimile transmission for transmitting from said line interfacing step said manuscript data read by said manuscript reading step or said copying operation which prints a number of copies through said printing step, for controlling copying said manuscript data read by said manuscript reading step from said line interfacing step, and for controlling counting by said digits counting step and storing by said storing step, the numerical value of either said telephone number of said facsimile transmission destination or said number of copies inputted from said operation means and/or a numerical value of a forefront-digit inputted from said operating step, wherein when zero is not the numerical value of said forefront-digit of the numerical value inputted from said operating step and said inputted numerical value exceeds a prescribed numerical value, said controlling step judges said inputted numerical value as the telephone number of the facsimile transmission destination, and wherein when said operation start is instructed by said operating step before the numerical value is inputted from said operating step, in which zero is not the numerical value of said forefront-digit of said inputted numerical value, and said inputted numerical value exceeds the maximum number of copies which can be copied, said controlling means judges said inputted numerical value as the telephone number of said facsimile transmission destination, and implements facsimile transmission of the data read in said manuscript reading step.

16. A method for automatic selection of either a facsimile transmission or a copying operation of a facsimile-copy combined apparatus, comprising the steps of:

a manuscript reading step for reading data of either a manuscript of a facsimile transmission or a manuscript of a copying operation, and for transmitting manuscript data which is read;

a line interfacing step for implementing control of at least one of a facsimile transmission and a facsimile reception and for receiving facsimile data;

a printing step for printing either the facsimile data received from said line interfacing step or said data of the manuscript of the copying operation;

an operating step for instructing start of either said facsimile transmission or said copying operation, after inputting telephone number and number of copies thereto respectively;

a digits counting step for counting a number of digits of either said telephone number of facsimile transmission destination or the number of copies inputted from said operating step;

a storing step for storing a numerical value of either said telephone number of said facsimile transmission destination or said number of copies inputted from said operating step; and a controlling step for implementing control of automatically selecting for execution either said facsimile transmission for transmitting from said line interfacing step said manuscript data read by said manuscript reading step or said copying operation which prints a number of copies through said printing step, for controlling copying said manuscript data read by said manuscript reading step from said line interfacing step, and for controlling counting by said digits counting step and storing by said storing step, the numerical value of either said telephone number of said facsimile transmission destination or said number of copies inputted from said operation means and/or a numerical value of a forefront-digit inputted from said operating step, wherein when zero is not the numerical value of said forefront-digit of the numerical value inputted from said operating step and said inputted numerical value does not exceed a prescribed numerical value, said controlling step judges said inputted numerical value as the number of copies for copying, and wherein when said operation start is instructed by said operating step before the numerical value is inputted by said operating step, in which zero is not the numerical value of said forefront-digit of said inputted numerical value, and said inputted numerical value does not exceed the maximum number of copies which can be copied, said controlling step judges said inputted numerical value as the number of copies of said data read in said manuscript reading step which are to be made.

17. A facsimile-copy combined apparatus, comprising:

a first input device which receives at least one of facsimile transmission data and data of a copying operation;

a line interface which transmits said facsimile transmission data to a facsimile transmission destination when a facsimile transmission mode is selected;

a printer which makes a number of copies using said data of a copying operation when a copying mode is selected;

a second input device which inputs a numerical value of either a telephone number of the facsimile transmission destination or the number of copies to be made; and a controller which automatically selects, based on the value of a first digit input by the second input device, either the facsimile transmission mode or the copying mode.

18. A facsimile-copy combined apparatus as set forth in claim 17, wherein when the first digit input by the second input device is zero, the controller selects the facsimile transmission mode.

19. A facsimile-copy combined apparatus, comprising:

a first input device which receives at least one of facsimile transmission data and data of a copying operation;

a line interface which transmits said facsimile transmission data when a facsimile transmission mode is selected;

a printer which makes a number of copies using said data of a copying operation when a copying mode is selected;

a second input device which inputs a numerical value of either a telephone number of a facsimile transmission destination or the number of copies to be made;

a digit counter for counting the number of digits in the numerical value input by said second input device; and a controller which automatically selects, based on the value of a first digit input by said second input device and on the number of digits counted by said digit counter, either the facsimile transmission mode or the copying mode.

20. A method of using a facsimile-copy combined apparatus, comprising:

receiving at least one of facsimile transmission data and data of a copying operation;

transmitting said facsimile transmission data when a facsimile transmission mode is selected;

making a number of copies using said data of a copying operation when a copying mode is selected;

inputting a numerical value of either a telephone number of a facsimile transmission destination or the number of copies to be made; and automatically selecting, based on the value of a first digit input in said inputting step, either the facsimile transmission mode or the copying mode.

21. A method of using a facsimile-copy combined apparatus as set forth in claim 20, wherein the facsimile transmission mode is automatically selected when the first digit of the numerical value input in the inputting step is zero.

22. A method of using a facsimile-copy combined apparatus, comprising:

receiving at least one of facsimile transmission data and data of a copying operation;

transmitting said facsimile transmission data when a facsimile transmission mode is selected;

making a number of copies using said data of a copying operation when a copying mode is selected;

inputting a numerical value of either a telephone number of a facsimile transmission destination or the number of copies to be made;

counting the number of digits in the numerical value input in said inputting step; and automatically selecting, based on the value of a first digit of the numerical value input in said inputting step and on the number of digits counted by said digital counter, either the facsimile transmission mode or the copying mode.

* * * * *